(No Model.) 2 Sheets—Sheet 1.

C. WRIGHT.
POTATO DIGGER.

No. 445,868. Patented Feb. 3, 1891.

Witnesses:
E. P. Ellis
B. Brocker

Inventor:
Chester Wright,
per
F. W. Lehmann,
atty

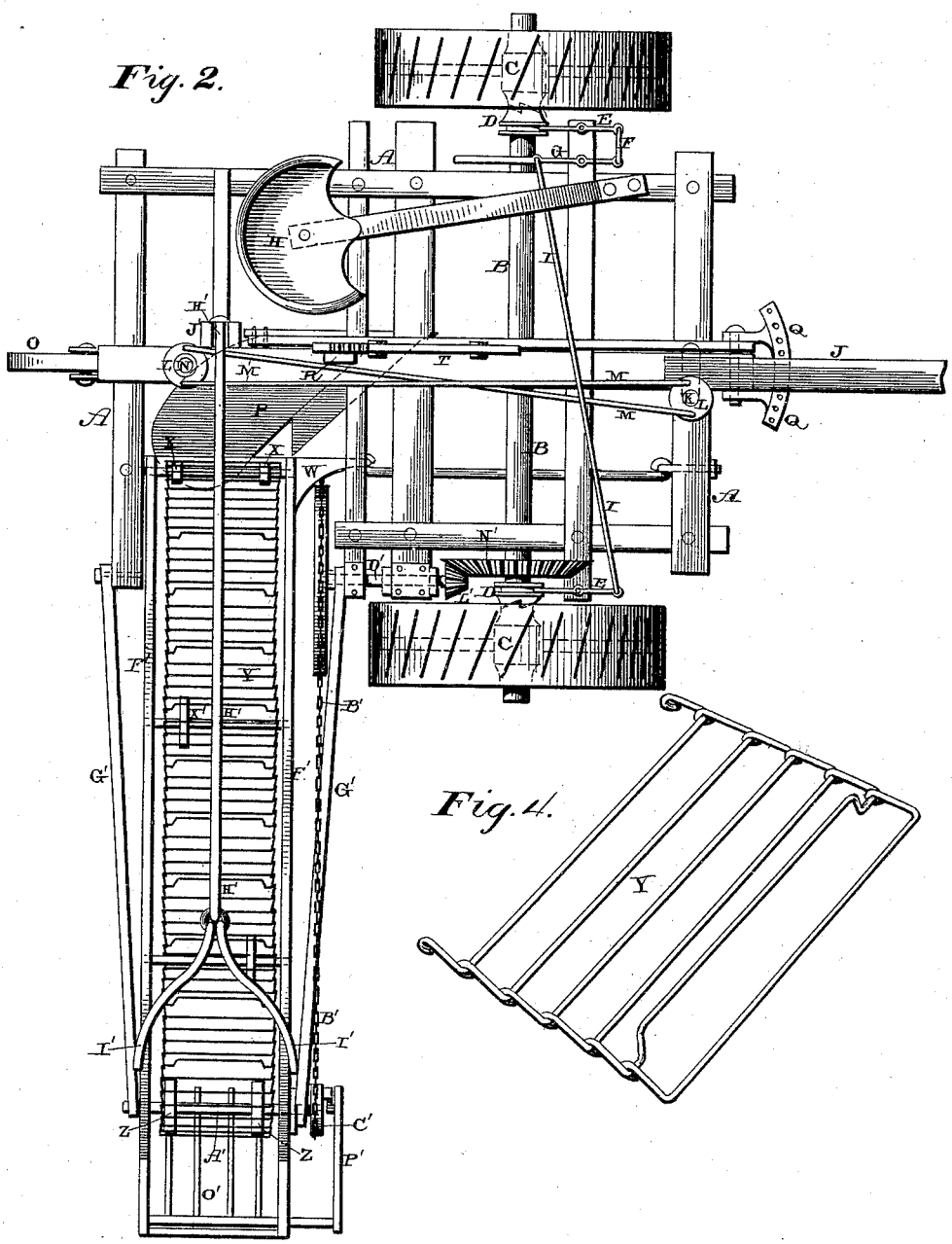

UNITED STATES PATENT OFFICE.

CHESTER WRIGHT, OF FAIRFIELD, NEBRASKA.

POTATO-DIGGER.

SPECIFICATION forming part of Letters Patent No. 445,868, dated February 3, 1891.

Application filed March 31, 1890. Serial No. 346,063. (No model.)

*To all whom it may concern:*

Be it known that I, CHESTER WRIGHT, of Fairfield, in the county of Clay and State of Nebraska, have invented certain new and useful Improvements in Potato-Diggers; and I do hereby declare the following to be a full, clear, and exact description of the invention, such as will enable others skilled in the art to which it pertains to make and use it, reference being had to the accompanying drawings, which form part of this specification.

My invention relates to an improvement in potato-diggers; and it consists in the particular arrangement and combination of parts, which will be fully described hereinafter, and pointed out in the claims.

The object of my invention is to provide a potato-digger with a guiding mechanism, by means of which the machine can be quickly and easily turned; to so brace the elevator as to prevent all friction upon the shaft of the gearing and to permit the bottom of the elevator to be raised and lowered without extra tension upon the elevator-chain; to provide a mechanism for separating the vines from the potatoes and force the vines outside of the box into which the potatoes are dropped; to form the elevator of rods which are connected at their ends, so as to form an endless chain, and to give to the elevator a shaking movement by means of devices provided for that purpose, so as to separate the dirt from the potatoes.

Figure 1:
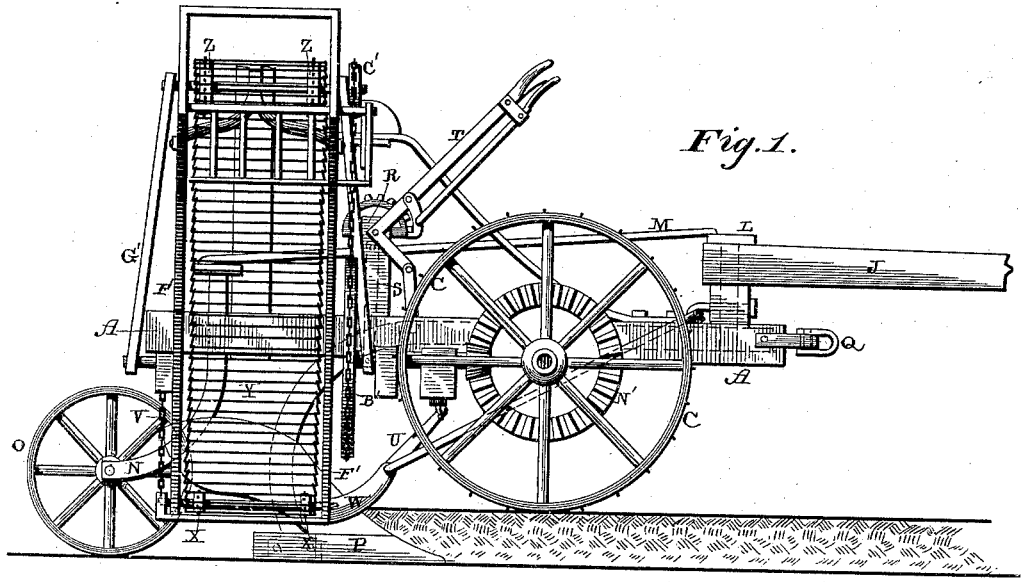
Figure 3:
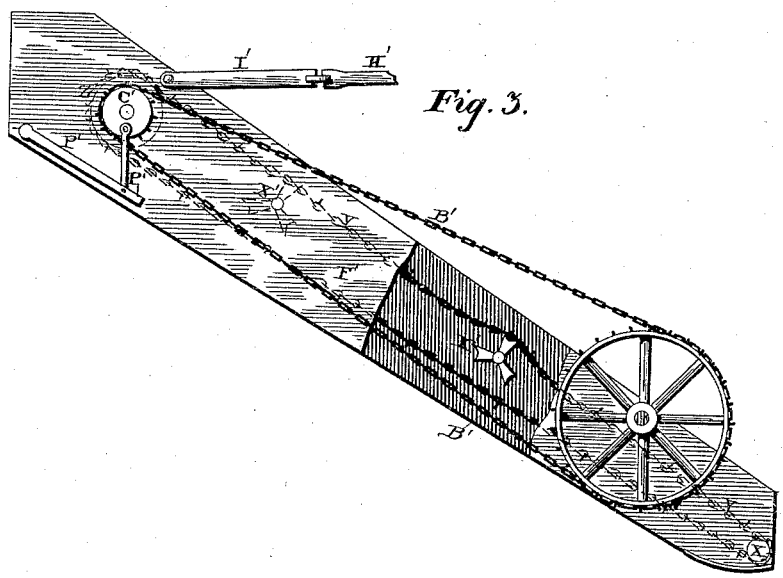

Figure 1 is a side elevation of a machine which embodies my invention. Fig. 2 is a plan view of the same. Fig. 3 is a detail view of the elevator. Fig. 4 is a detail in perspective of a portion of the elevator-rods, showing their construction.

A represents the frame, either of the construction here shown or any other that may be preferred, and which is supported by the axle B and the two driving-wheels C. Formed upon the inner end of the hub of each wheel C are ratchet-teeth, and placed upon the axle just inside of each of these wheels is the sliding portion D of the clutch, by means of which the wheels are locked to or disengaged from the axle. Connected with the sliding portion D of the clutch on the left-hand side of the frame is a lever E, which is pivoted at or near its center upon the top of the frame A, and connected at the outer end of this lever is the rod F, which serves to connect the lever E with the lever G, which extends conveniently near to the driver's seat H, and by means of which the driver throws the wheels in and out of gear at will. To the clutch on the right-hand side of the frame is also connected a lever E, and to the outer end of this lever is fastened the connecting-rod I, which extends across the frame and is fastened to the lever G on the opposite side of its pivot from the rod F. The movement of the lever G by the driver's feet operates the two clutches upon opposite sides of the machine at the same time.

Secured to the front end of the frame A is the tongue J. Rising above the top of the front end of the frame is a shaft K, upon which is placed a wheel L, to opposite sides of which are connected the chains, rods, or wires M, which cross at or near their centers, and which are secured at their rear ends to a corresponding wheel L of the standard N of the guiding-wheel O, which supports the rear end of the frame and runs in the furrow formed by the plow. The object of providing the wheels L and having two rods which cross is to do away with bell-crank levers and to cause the rear wheel to turn in an opposite direction from which the tongue is turned. The shaft K passes down through into the frame and is secured to the tongue, so as to be moved thereby as the tongue is turned either to the right or to the left. As the tongue turns, the wheels L are turned through the chains or rods M, and thus the guiding-wheel O is turned at the same time in a corresponding direction, so as to enable the machine to be turned in a much smaller space than could be done if this construction were not used.

The potatoes are dug by the plow P, the beam of which extends forward and is bolted to the front end of the frame A, and to both of which the clevis Q is fastened.

Rising above the top of the frame is a standard or support R, and secured to one side of this standard is a guiding-bar S. The plow-beam moves between the parts R S, and is held from any lateral movement thereby. Mounted upon this standard R and rising up convenient to the driver's seat H is an operating-lever T, which is connected at its lower end by suitable connecting-rods to the plow-beam, so that the plow can be raised or lowered to be thrown in and out of operation whenever so desired.

Supported from the under side of the frame A by the hanger U and chain V is the runner W for the lower end of the elevator. Upon the rod extending from the runner W are placed the two sprocket-wheels X, around which the elevator Y passes at its lower end. The upper portion of the elevator passes around the wheels Z upon the shaft A', which receives its motion through the chain B', which extends around the driving-wheel C', secured thereon. The wheels Z at the upper end of the elevator are larger than the wheels X at the lower end. The lower end of the elevator-frame F' is pivoted upon the same rod upon which the wheels X are placed, and the upper end of this frame is supported both by the brace-rods G', which have their upper ends fastened to the shaft A', and by the brace H', which has the bail I' secured to its upper end. The inner end of this brace H' is made to catch in a notch or groove formed in the upper end of the standard J', which is braced in position in any suitable manner. By means of the brace H' the upper end of the elevator can be raised or lowered to any desired degree. The shaft D' has a pinion L' secured to one end, and this pinion meshes with the wheel N', secured to the axle B. As soon as the clutches D are thrown into operation by the lever G the shaft is made to revolve with the wheels C, and then the elevator is set in motion. The lower end of the elevator approaches sufficiently near to the plow P to have the dirt and potatoes thrown upon it, and this elevator moves sufficiently fast to spread the dirt and potatoes out thinly over its surface. The dirt is shaken through and falls to the ground, while the potatoes are carried up and dropped in the frame O', which separates the vines from the potatoes.

Connected eccentrically to the wheel C' is the rod P', which is attached to the frame O', and this rod imparts to the frame a constant reciprocating motion for the purpose of separating the vines from the potatoes. The vines are forced beyond the frame O', while the potatoes drop through into a wagon-box or other receptacle drawn along to receive them.

The elevator Y is composed of iron rods about eighteen inches long, which are hooked together at their ends, every fifth rod being raised about a half-inch above the others, so as to assist in elevating the potatoes. By means of the construction here shown and described the elevator is braced in position in such a manner as to prevent any unnecessary friction upon the shaft of the gearing and the bottom of the elevator can be raised and lowered without extra tension upon the elevator-chains. The elevator formed of a series of rods which are connected at their ends so as to form an endless chain is given a shaking movement by means of the revolving shakers X', (shown in Fig. 3) and which as the elevator revolves causes the shakers to also revolve and at the same time shake the dirt loose from the potatoes before they reach the top of the elevator. At suitable intervals apart one of the rods which forms this elevator is bent or cranked at each end, so as to raise the central portion of the rod above the others, and thus cause them to catch the potatoes and carry them up.

Having thus described my invention, I claim—

1. The combination of the frame, the pivoted tongue, the partially-revolving shaft secured to the tongue and provided with a wheel, the rods or chains M, which cross each other, and the guiding-wheel secured to the rear of the frame, the stem of which wheel is also provided with a wheel and to which the rear ends of the chains or rods are connected, substantially as shown.

2. In a potato-digger, the combination of the main frame, a plow supported thereby, an elevator-runner supported by the frame at one side of the plow, an elevator extending at right angles to the main frame and having its lower end secured to the runner, a support upon the main frame, and a supporting-rod having one end connected to the support and its opposite end to the outer end of the elevator, substantially as shown.

3. In a potato-digger, the combination of the main frame, a plow supported thereby, an elevator-runner supported by the frame at one side of the plow, a shaft journaled in the said runner, the elevator-frame having its inner end secured to the said shaft, a shaft journaled in the outer end of the elevator, the elevator-chain which passes around the said shafts, a support for the outer end of the said elevator-frame, and a mechanism for operating the said elevator-chain, substantially as described.

4. An elevator-chain composed of wires which have their ends connected, some of the wires having their centers bent upward, so as to form transverse steps which catch the potatoes, substantially as described.

In testimony whereof I affix my signature in presence of two witnesses.

CHESTER WRIGHT.

Witnesses:
A. B. SMITH,
J. E. SPATZ.